United States Patent
Chan et al.

(10) Patent No.: US 7,242,594 B2
(45) Date of Patent: *Jul. 10, 2007

(54) FULL BRIDGE INVERTER WITH PUSH/PULL CONTROL CHIP

(75) Inventors: Chun-Kong Chan, Hsi Chih (TW); Jeng-Shong Wang, Hsin Chuang (TW)

(73) Assignee: Lien Chang Electronic Enterprise Co., Ltd., Taipei County (TW)

(*) Notice: Subject to any disclaimer, the term of this patent is extended or adjusted under 35 U.S.C. 154(b) by 250 days.

This patent is subject to a terminal disclaimer.

(21) Appl. No.: 10/935,129

(22) Filed: Sep. 8, 2004

(65) Prior Publication Data
US 2006/0050543 A1    Mar. 9, 2006

(30) Foreign Application Priority Data
Feb. 10, 2004    (TW) .............................. 93103092 A

(51) Int. Cl.
H02M 3/335  (2006.01)
H03B 1/00   (2006.01)

(52) U.S. Cl. ..................... 363/17; 363/132; 327/112

(58) Field of Classification Search .................. 363/16, 363/17, 25, 26, 98, 132, 133, 134; 315/308; 327/110, 112
See application file for complete search history.

(56) References Cited

U.S. PATENT DOCUMENTS

| 7,064,588 B2* | 6/2006 | Chan et al. ................. 327/110 |
| 2006/0017406 A1* | 1/2006 | Ball ........................... 315/308 |

* cited by examiner

Primary Examiner—Jessica Han
(74) Attorney, Agent, or Firm—Rosenberg, Klein & Lee

(57) ABSTRACT

A full bridge inverter with a push/pull control chip uses two similar drivers to connect to the prior art full bridge switch assembly, and controls the prior art full bridge switch assembly with the push/pull control chip. The full bridge inverter comprises a push/pull control chip with two output terminals. Two drivers both have an input terminal and an output terminal. The input terminal is connected to the output terminals of the push/pull control chip and a full bridge switch assembly with four electronic switches. Each electronic switch has a control terminal connected to the output terminal of the two drivers so as to convert DC power into AC power by the two drivers.

6 Claims, 6 Drawing Sheets

FULL BRIDGE INVERTER WITH PUSH/PULL CONTROL CHIP

BACKGROUND OF THE INVENTION

1. Field of the Invention

The present invention relates to a full bridge inverter with a push/pull control chip, and more specifically relates to a push/pull control chip controlling the full bridge switch assembly for driving the load.

2. Description of the Related Art

The primary power supply of the cold cathode fluorescent lamp (CCFL) of the TFT LCD is used with the inverter circuit. The prior art inverter circuit converts DC power into AC power, and is discriminated into half bridge inverter, full bridge inverter and push/pull inverter, for example, by the topology of the different circuits.

Referring to FIG. 1, the transformer T1 divides the whole circuit into a front circuit 101 and a back circuit 102, and there is a push/pull control chip 103 connected between the front circuit 101 and the back circuit 102. The front circuit 101 comprises a DC power, a first switch Q1, a second switch Q2 etc. and the back circuit 102 comprises at least a capacitor (C1, C2, C3), a load, at least a diode (D1, D2) etc.

Referring to FIG. 2, the push/pull control chip 103 transmits a first control signal a and a second control signal b to the first switch Q1 and the second switch Q2, respectively, for switching the two switches. Power is thus supplied to the load through the transformer T1 according to the DC power. The voltage wave c of the secondary of the transformer T1 is the wave of the ac voltage at point C in FIG. 2.

In the above description, the push/pull control chip 103 is chip LX1686 and the series LX1686, LX1688, LX1691 of the LINFINITY (MICROSEMI) Corp., the series of the chip O2-9RR of the O2 Micro International Limited Corp., and the series of the chip BIT3105, BIT3494 of the Beyond Innovation Technology Corp.

As shown in FIG. 3, the transformer T2 divides the whole circuit into a front circuit 201 and a back circuit 202. The front circuit 201 comprises four electronic switches (P1, P2, N1, N2), a full bridge control chip 203 and a capacitor C1. Moreover the back circuit 202 comprises a load. Referring to FIG. 4, the full bridge control chip 203 transmits four control signals (POUT1, POUT2, NOUT1, NOUT2) to the four electronic switches (P1, P2, N1, N2), respectively; by switching those switches, power is supplied to the load through the transformer T2 according to the DC power. The full bridge control chip 203 is the BIT3105 of the Beyond Innovation Technology Corp.

In the above description, driving the full bridge switch assembly requires the full bridge control chip 203 and driving the push/pull inverter requires the push/pull control chip 103, thus lacking practical flexibility. Furthermore, the control chip of the inverter circuit is limited in use so as to be hard to purchase together.

SUMMARY OF THE INVENTION

The primary object of the present invention uses two similar drivers to connect between the output terminal of the push/pull control chip and the control terminal of the full bridge switch assembly, and the push/pull control chip controls the full bridge switch assembly for switching.

The present invention is connected between the four electronic switches (P1, P2, N1, N2) of the full bridge switch assembly of the prior art and the push/pull control chip with the two similar drivers. Moreover, the push/pull control chip controls switching of the four electronic switches (P1, P2, N1, N2) of the full bridge switch assembly through two similar drivers.

In the above description, the driver comprises a first accelerated diode connected to the output terminal of the push/pull control chip with a negative pole terminal and connected to the control terminal of the electronic switch with a positive pole terminal for speedily cutting off the N-MOSFET, a first resistor parallel to the first accelerated diode for restraining the current via the control terminal of the N-MOSFET, a link capacitor connected to the negative pole terminal of the first accelerated diode and the positive pole terminal of a second accelerated diode and thereby the second accelerated diode connected to the control terminal of the P-MOSFET with a negative pole terminal for speedily cutting off the P-MOSFET, a second resistor parallel to the second accelerated diode for restraining the current via the control terminal of the P-MOSFET, a Zener diode connected to a positive pole terminal of the second accelerated diode with a positive pole terminal and connected to the DC power with a negative pole terminal for preventing excessive voltage. A third resistor is parallel to the Zener diode for producing a Zener voltage.

In the above description, the present invention receives the control signals transmitted from the push/pull control chip with two similar drivers for controlling the four electronic switches (P1, P2, N1, N2) of the full bridge switch assembly for switching.

Then the present invention uses two similar drivers to connect to the prior art full bridge switch assembly, and the prior art full bridge switch assembly controlled by the push/pull control chip. The present invention also can use the push/pull control chip to control the push/pull inverter and control the full bridge switch assembly through the two drivers so as to increase the flexibility and the practical worth thereof.

BRIEF DESCRIPTION OF THE DRAWINGS

The various objects and advantages of the present invention will be more readily understood from the following detailed description when read in conjunction with the appended drawing, in which.

DETAILED DESCRIPTION OF PREFERRED EMBODIMENTS

Figure 1:
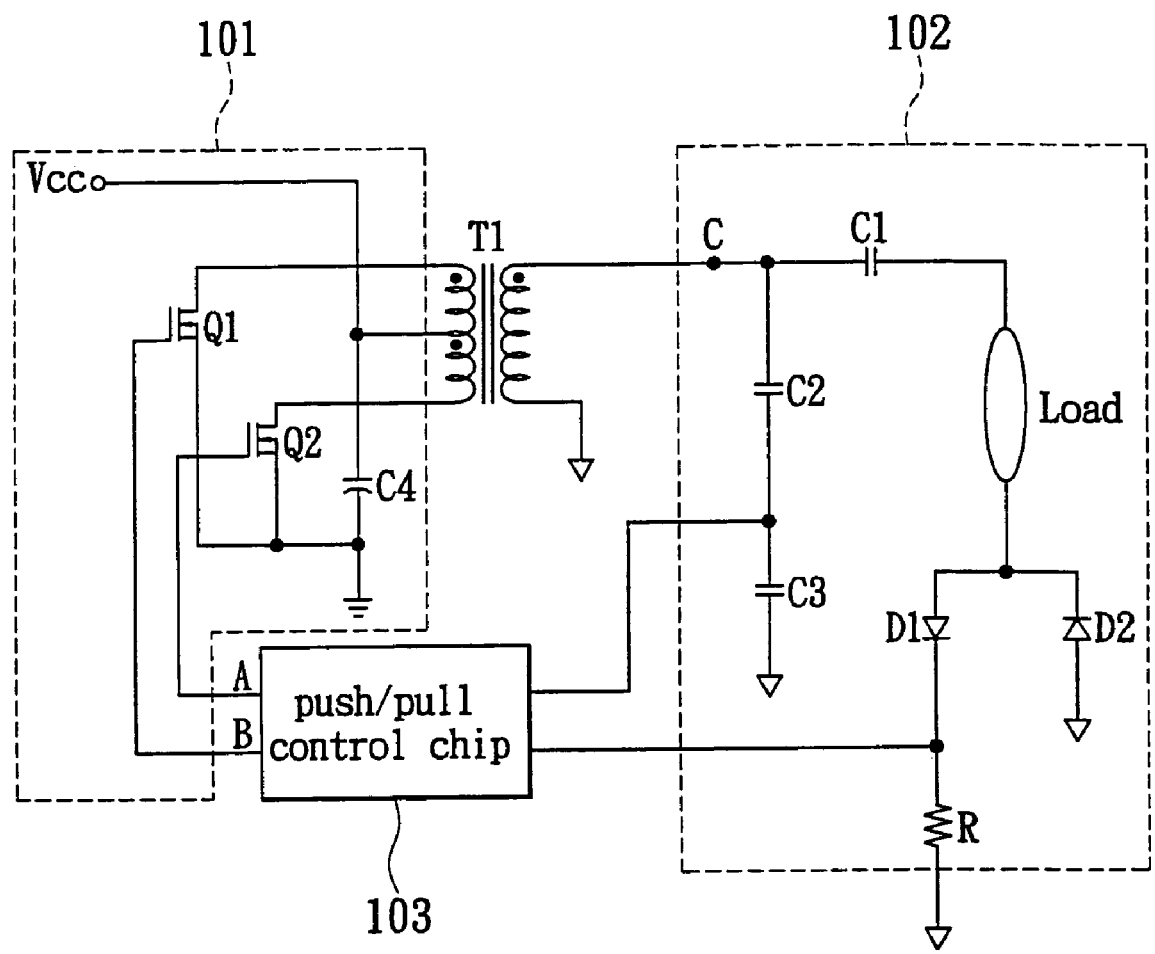
FIG. 1 is a circuit schematic diagram of a prior art push/pull inverter driving the load.
Figure 2:
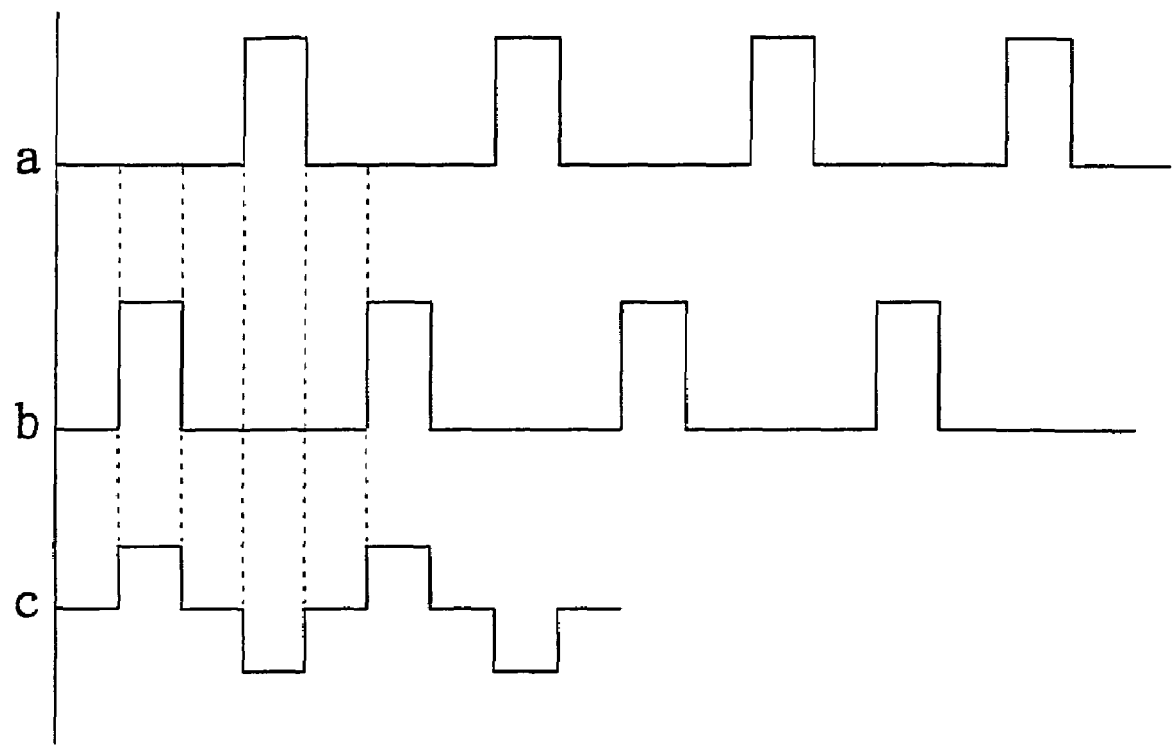
FIG. 2 is a wave schematic diagram of control signals of the push/pull control chip and the voltage of the load.
Figure 3:
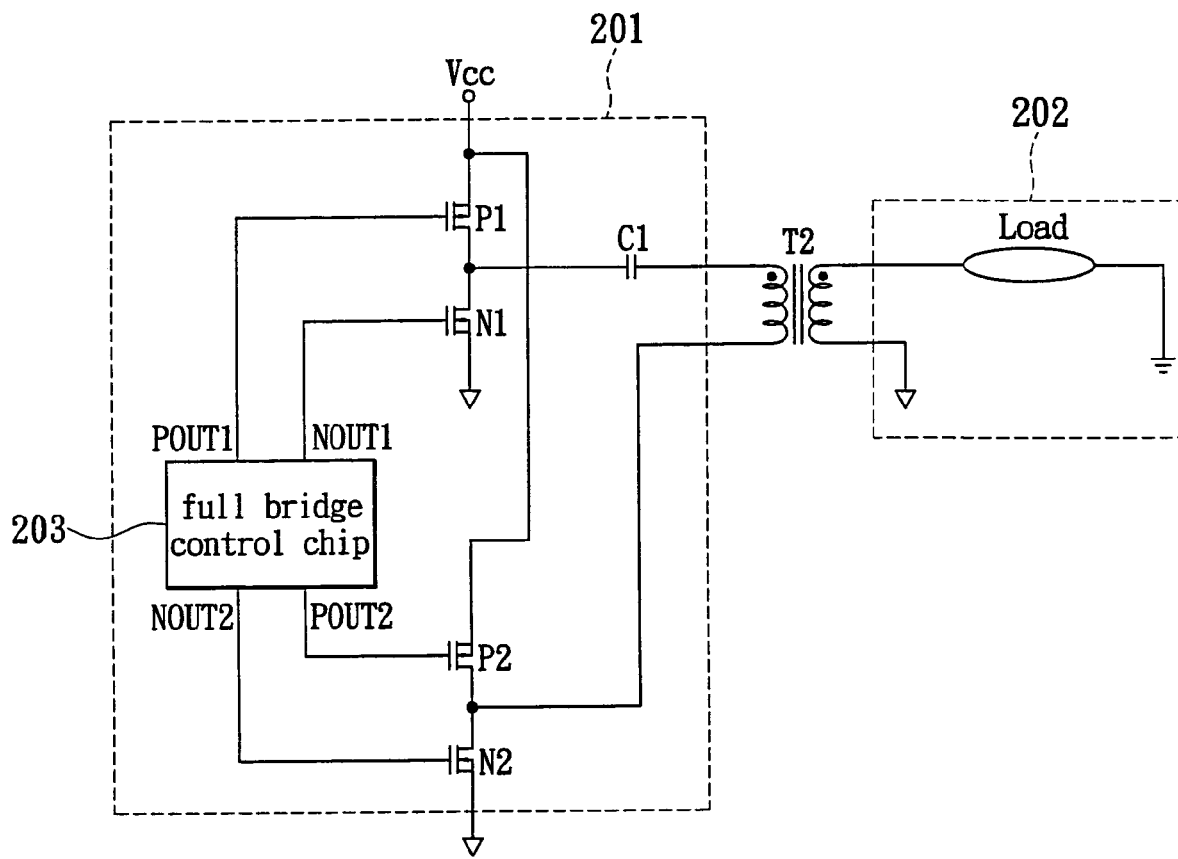
FIG. 3 is a circuit schematic diagram of a prior art full bridge inverter driving the load.
Figure 4:
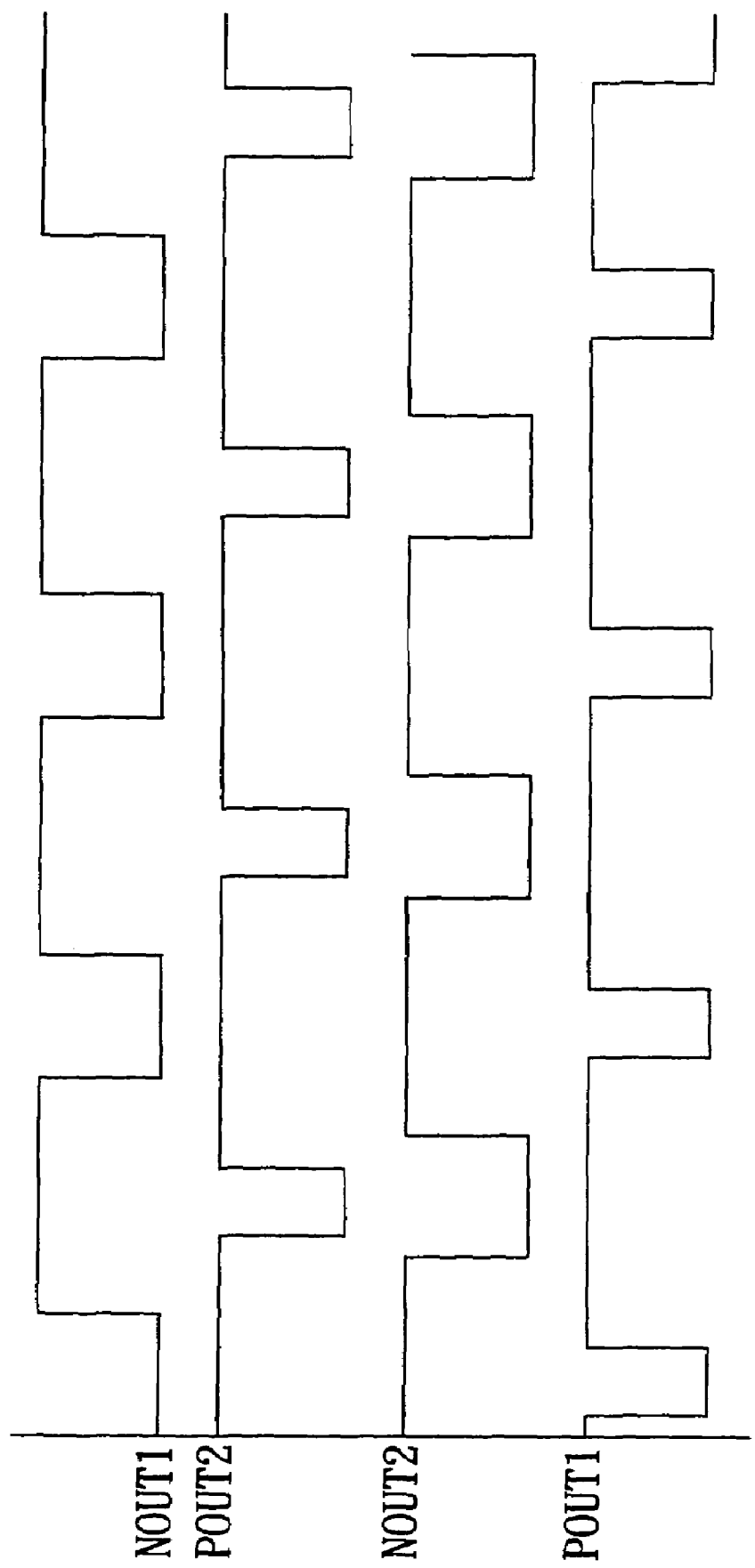
FIG. 4 is a wave schematic diagram of control signals of a prior art full bridge inverter.
Figure 5:
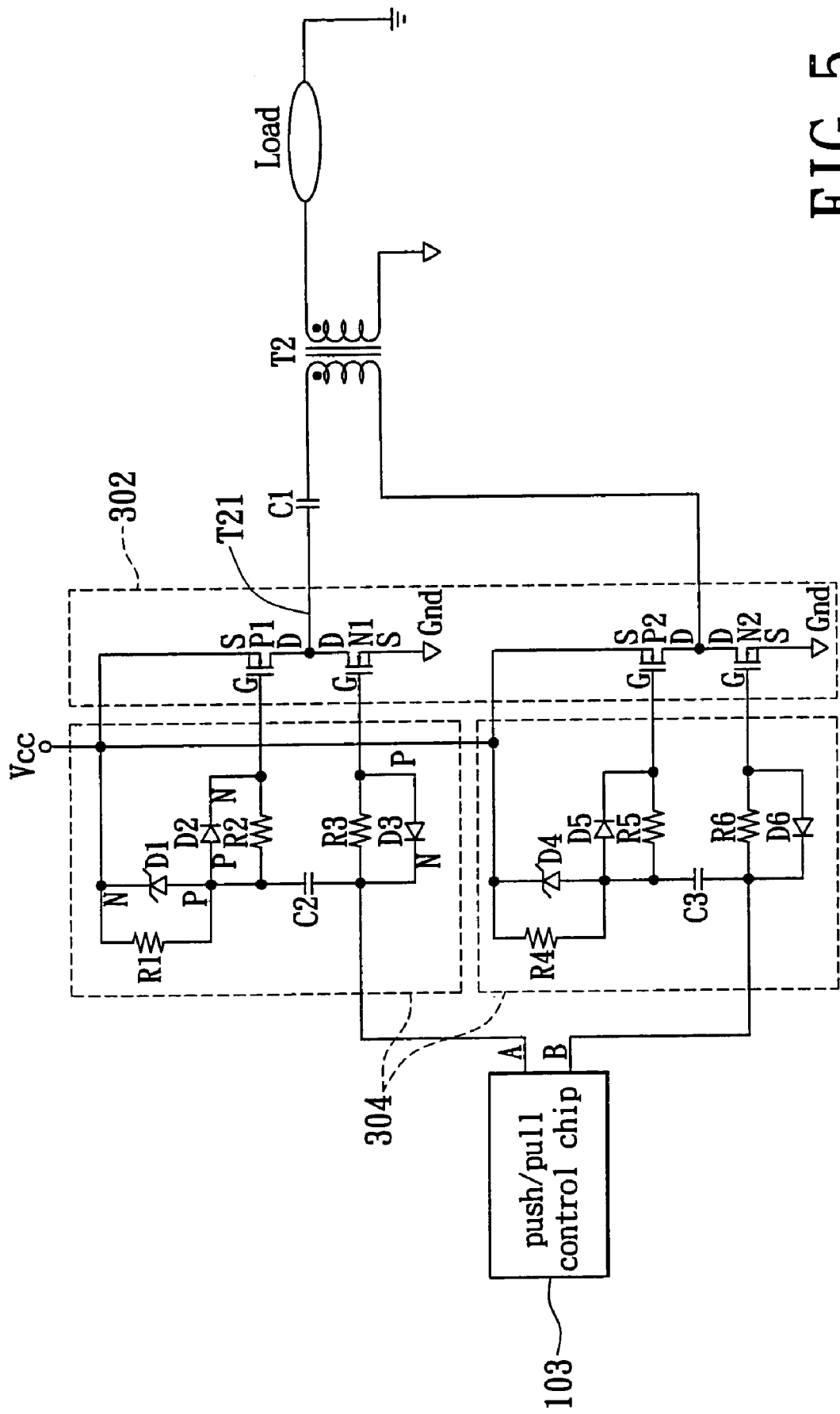
FIG. 5 is a circuit schematic diagram of the push/pull control chip controlling the full bridge switch assembly of the present invention.

Referring to FIG. 5, the present invention connects to the primary winding of a transformer T2 through a full bridge switch assembly 302 for converting DC power VCC into AC power, and supplies power to the load through the transformer T2. In the above description, the peak to peak of the AC power is a voltage of 2VCC.

Referring to FIG. 5, the present invention comprises a push/pull control chip 103, two drivers 304 and a full bridge switch assembly 302. The push/pull control chip 103 transmits two control signals through two output terminals A and B. The input terminals of the two drivers 304 are connected to the two output terminals A and B of the push/pull control chip 103, respectively, and are controlled by the push/pull control chip 103. The full bridge switch assembly includes four electronic switches (P1, P2, N1, N2), and connects to the output terminal of the two drivers 304 with control terminal G of each electronic switch. Moreover, the present invention converts DC power into AC power with the two drivers 304, and transmits the AC power to the primary winding of the transformer T2. In the above description, the electronic switches P1, P2 are P-MOSFET switches and the electronic switches N1, N2 are N-MOSFET switches.

Referring to FIG. 5, the sources of the electronic switch P1, P2 are connected to the DC power, and the sources of the electronic switch N1, N2 are connected to a reference terminal. The drains of the electronic switches P1, N1 are connected to one terminal of the primary winding of the transformer T2, and the drains of the electronic switches P2, N2 are connected to other terminals of the primary winding of the transformer T2. Moreover, the control terminal of the electronic switches P1, P2, N1, N2 are connected to the output terminal of the driver 304, respectively. In the above description, the electronic switch P1, P2, N1, N2 constitute the full bridge switch assembly, and the electronic switch P1, N2 constitute a positive half cycle driver, while the electronic switches N1 and P2 constitute a negative half cycle driver so as to form the AC power.

Referring to FIG. 5, a driver 304 comprises a first accelerated diode D3 connected to a output terminal A of the push/pull control chip 103 with a negative pole terminal and connected to the control terminal G of the electronic switch N1 with a positive pole terminal, while a first resistor R3 is connected in parallel with the first accelerated diode D3. A second accelerated diode D2 is connected to the control terminal G of the electronic switch P1 with a negative pole terminal and is connected to the output terminal A of the push/pull control chip 103 through a link capacitor C2 with a positive pole terminal; a second resistor R2 is connected in parallel with the second accelerated diode D2. Moreover, a Zener diode D1 is connected to a positive pole terminal of the second accelerated diode D2 with a positive pole terminal and connected to the DC power with a negative pole terminal, and a third resistor R1 is connected in parallel with the Zener diode D1. The driver 304 mentioned above is used to drive the electronic switch P1 and electronic switch N1.

Referring to FIG. 5, in the above description, the other driver 304 comprises a first accelerated diode D6 connected to an output terminal B of the push/pull control chip 103 with a negative pole terminal and connected to the control terminal G of the electronic switch N2 with a positive pole terminal; a first resistor R6 is connected in parallel with the first accelerated diode D6. A second accelerated diode D5 is connected to the control terminal G of the electronic switch P2 with a negative pole terminal and connected to the output terminal B of the push/pull control chip 103 through a link capacitor C3 with a positive pole terminal; a second resistor R5 is connected in parallel with the second accelerated diode D5. Moreover, a Zener diode D4 is connected to a positive pole terminal of the second accelerated diode D5 with a positive pole terminal and connected to the DC power with a negative pole terminal; a third resistor R4 is connected in parallel with the Zener diode D4. The driver 304 mentioned above is used to drive the electronic switch P2 and electronic switch N2.

In the above description, the two drivers 304 are controlled by the push/pull control chip 103 for driving the four electronic switches (N1, N2, P1, P2) of the full bridge switch assembly 302 so as to convert the DC power into the AC power, and the AC power is transmitted to the primary winding of the transformer T2. A capacitor C1 is connected to the primary winding of the transformer T2 and the full bridge switch assembly 302 for disconnecting the DC component in the AC power.

Figure 6:
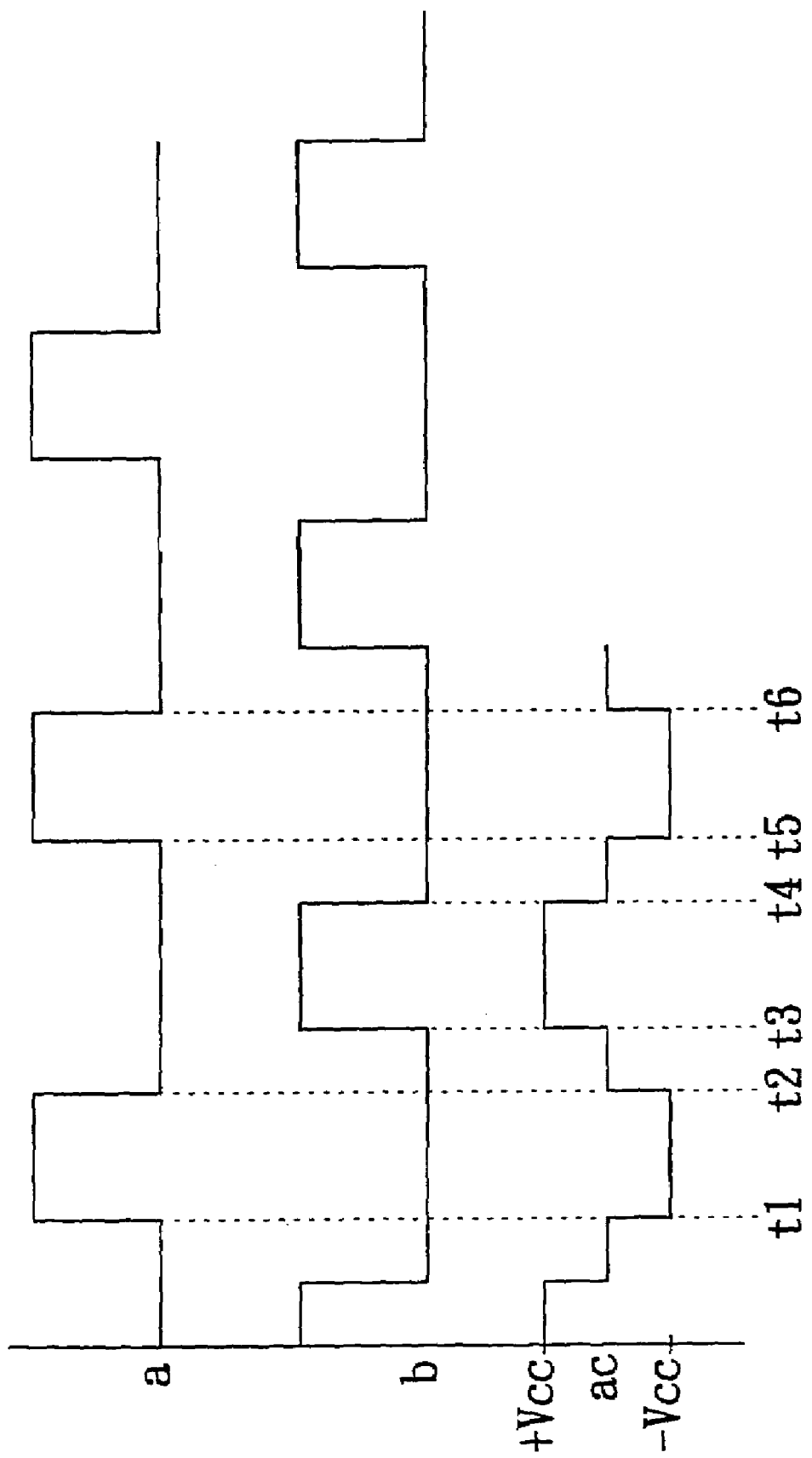
FIG. 6 is a wave schematic diagram of control signals of the push/pull control chip and the voltage of the AC power.

Referring also to FIG. 5, in FIG. 6, the push/pull control chip 103 is the chip LX1686 and the series LX1686, LX1688, LX1691 of the LINFINITY (MICROSEMI) Corp., and the series of the chip O2-9RR of the O2 Micro International Limited Corp., and the series of the chip BIT3105, BIT3494 of the Beyond Innovation Technology Corp.

A first control signal a is output via the output terminal A of the push/pull control chip 103, and a second control signal b is output via the output terminal B of the push/pull control chip 103. Moreover, a voltage wave ac of the AC power is in the terminal T21 of the primary winding of the transformer T2, and the peak to peak of the AC power is 2 DC power.

Referring to FIG. 5, as well as FIG. 6, at time t1-t2, the potential of the first control signal a is high and the second control signal b is the low potential. The first control signal a is transmitted to the control terminal G of the electronic switch N1 through the first resistor R3 to turn on the electronic switch N1, and transmitted to the control terminal G of the electronic switch P1 through the link capacitor C2, the second accelerated diode D2 and the second resistor R2 to turn off electronic switch P1. Moreover, the second accelerated diode D2 accelerates turning off the electronic switch P1. The second control signal b is transmitted to the control terminal G of the electronic switch N2 through the first accelerated diode D6 to turn off the electronic switch N2, and transmitted to the control terminal G of the electronic switch P2 through link capacitor C3 and the second resistor R5 to turn off the electronic switch P2.

At this time, the electronic switches N1 and P2 are on and the electronic switches N2, P1 are off. DC power is then transmitted to the primary winding of the transformer T2 by turning on the electronic switch N1, P2, and the AC power measured at the terminal T21 of the transformer T2 is the negative of the DC power.

Referring also to FIG. 5, as well as FIG. 6, at time t2-t3, the potential of the first control signal a is reduced to low from high and the second control signal b still at the low potential. At this time, the first accelerated diode D3 accelerates turning the electronic switch N1. The first control signal a is transmitted to the control terminal G of the electronic switch P1 through the link capacitor C2 and the second resistor R2 to turn on the electronic switch P1. Because the second control signal b is still at the low potential, the electronic switch P2 is still on and the electronic switch N2 is still off.

It is understood that, in the above description, when time is t2-t3, the electronic switches P1, P2 are on and the electronic switches N1, N2 are off. At this time, the energy stored in the transformer T2 leaks according to the short of the primary winding of the transformer T2. The AC power measured at the terminal T21 of the transformer T2 is then at the zero potential.

Referring also to FIG. 5, as well as FIG. 6, at time t3-t4, the first control signal a still at the low potential and the potential of the second control signal b is reduced to low level from high level. The second control signal b is transmitted to the control terminal G of the electronic switch N2 through the first resistor R6 to turn on the electronic switch N2, and transmitted to the control terminal G of the electronic switch P2 through the link capacitor C3, the second accelerated diode D5 and the second resistor R5 to turn off the electronic switch P2. Moreover, the second accelerated diode D5 accelerates turning off the electronic switch P2. Because the first control signal a is still at a low potential, the electronic switch P1 is still on and the electronic switch N1 is still off.

At this time, the electronic switches N2, P1 is on and the electronic switches N1, P2 is off. The DC power is then transmitted to the primary winding of the transformer T2 by turning on the electronic switches N2, P1, and the AC power measured at the terminal T21 of the transformer T2 is the positive of the DC power.

Referring also to FIG. 5, as well as FIG. 6, at time t4-t5, the first control signal a is still at the low potential and the potential of the second control signal b is increased to high level from low level. At this time, the first accelerated diode D6 accelerates turning off the electronic switch N2. The second control signal b is transmitted to the control terminal G of the electronic switch P2 through the link capacitor C3 and the second resistor R5 to turn on the electronic switch P2. Because the first control signal a is still at the low potential, the electronic switch P1 is still on and the electronic switch N1 is still off.

It is understood that, in the above description, when time is t4-t5, the electronic switches P1, P2 are on and the electronic switches N1, N2 are off. At this time, the energy stored in the transformer T2 leaks according to the short of the primary winding of the transformer T2. The AC power measured at the terminal T21 of the transformer T2 is then at the zero potential.

Referring also to FIG. 5, as well as FIG. 6, the action of the present invention circuit and the voltage wave ac of the terminal T21 of the transformer T2 at time t5-t6 are the same at time t1-t2. The rest may be deduced by analogy from the above description. The peak to peak of the AC power is double DC power, and converted to the secondary winding of the transformer T2 for supplying the load with power.

Reference is made to FIG. 5, in which the Zener diodes D1 and D4 protect the electronic switches P1, P2 for preventing the over-voltage. Moreover, the third resistors R3, R4 are in parallel with the Zener diodes D1, D4, respectively, to provide a Zener voltage.

In the above description, the present invention uses two similar drivers to connect to the prior art full bridge switch assembly, and the prior art full bridge switch assembly is controlled by the push/pull control chip. The present invention uses the push/pull control chip to control the push/pull inverter and control the full bridge switch assembly through the two drivers so as to increase the flexibility and the practical value thereof.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

We claim:

1. A full bridge inverter connected to a primary winding of a transformer for converting DC power into AC power, the full bridge inverter comprising:
    a push/pull control chip having two output terminals; two drivers, both having an input terminal and an output terminal with the input terminals thereof connected to the output terminals of the push/pull control chip, and controlled by the push/pull control chip; and
    a full bridge switch assembly having four electronic switches, each electronic switch having a control terminal connected to the output terminal of the two drivers so as to convert the DC power into the AC power by the two drivers.

2. The full bridge inverter of claim 1, wherein the four electronic switches comprise two P-MOSFETs and two N-MOSFETs, and a P-MOSFET and an N-MOSFET form a positive half cycle driver and a negative half cycle driver.

3. The full bridge inverter of claim 1, wherein each source of the two P-MOSFETs is connected to the DC power.

4. The full bridge inverter of claim 1, wherein each source of the two N-MOSFETs is connected to a reference terminal.

5. The full bridge inverter of claim 1, wherein the driver comprises:
    a first accelerated diode connected to the output terminal of the push/pull control chip with a negative pole terminal and connected to the control terminal of the electronic switch with a positive pole terminal;
    a first resistor in parallel with the first accelerated diode;
    a second accelerated diode connected to the control terminal of the electronic switch with a negative pole terminal and connected to the output terminal of the push/pull control chip through a link capacitor with a positive pole terminal;
    a second resistor in parallel with the second accelerated diode; and
    a Zener diode connected to a positive pole terminal of the second accelerated diode with a positive pole terminal and connected to the DC power with a negative pole terminal; and
    a third resistor in parallel with the Zener diode.

6. The full bridge inverter of claim 1, further comprising a capacitor connected between the primary winding of the transformer and the full bridge switch assembly for disconnecting the DC component of the AC power.

* * * * *